(12) United States Patent
DeSisti et al.

(10) Patent No.: US 6,786,605 B2
(45) Date of Patent: Sep. 7, 2004

(54) DEVICE FOR ADAPTING A PROJECTOR TO DIFFERENT LAMPS

(75) Inventors: Mario DeSisti, Rome (IT); Fabio DeSisti, Rome (IT)

(73) Assignee: DeSisti Lighting S.p.A., Rome (IT)

( * ) Notice: Subject to any disclaimer, the term of this patent is extended or adjusted under 35 U.S.C. 154(b) by 0 days.

(21) Appl. No.: 10/251,926

(22) Filed: Sep. 20, 2002

(65) Prior Publication Data

US 2003/0076481 A1 Apr. 24, 2003

Related U.S. Application Data

(63) Continuation-in-part of application No. 09/543,974, filed on Apr. 7, 2000, now abandoned.

(51) Int. Cl.[7] .................. G03B 21/14; G03B 21/22; G03B 21/20; H01R 33/00; H01R 33/94
(52) U.S. Cl. .................. 353/119; 353/122; 353/85; 353/87; 362/226; 439/236; 439/638
(58) Field of Search .................. 353/85, 87, 94, 353/119, 122; 348/744, 836, 838, 839, 418, 419; 362/226; 439/236, 638

(56) References Cited

U.S. PATENT DOCUMENTS

| | | | |
|---|---|---|---|
| 1,404,751 A | | 1/1922 | Foster .................. 362/288 |
| 4,423,471 A | | 12/1983 | Drost et al. .................. 362/96 |
| 4,675,794 A | | 6/1987 | Reiling et al. .................. 362/289 |
| 4,890,202 A | * | 12/1989 | Blanche .................. 362/61 |
| 5,017,327 A | | 5/1991 | Bamber .................. 362/389 |
| 5,552,673 A | * | 9/1996 | Kenwood .................. 315/57 |

FOREIGN PATENT DOCUMENTS

| | | | |
|---|---|---|---|
| DE | 3109894 | 9/1982 | .......... F21V/19/02 |
| DE | 3710147 | 10/1988 | .......... F21V/23/00 |

* cited by examiner

*Primary Examiner*—Russell Adams
*Assistant Examiner*—Melissa J Koval
(74) *Attorney, Agent, or Firm*—Gauthier & Connors LLP

(57) ABSTRACT

A device for a projector to adaptively receive lamps of different sizes. The device includes a fixing element for fixing a lamp to a support structure of the fixing element. The lamp having a lamp tang. The fixing element provides a locking mechanism for the lamp and is adapted to receive at least two different diameters of lamp tangs. The fixing element for the lamp is movable between at least two positions, to adapt to a focal distance of a specific lamp.

10 Claims, 3 Drawing Sheets

12000 W

DEVICE FOR ADAPTING A PROJECTOR TO DIFFERENT LAMPS

PRIORITY INFORMATION

This application is a Continuation-in-Part of U.S. patent application Ser. No. 09/543,974, filed on Apr. 7, 2000 ABN.

BACKGROUND OF THE INVENTION

The present invention relates to a device for adapting a projector to different lamps.

More specifically, the invention relates to a device of the above kind allowing the same projector to be used with lamps having very different powers.

Particularly even if not exclusively, the invention is directed to projectors that are used for TV and cinema shootings.

The device according to the invention can be obviously used on any kind of projector employed in this field as well as in other fields.

As it is well known, in the cinema and/or TV shootings, lights play a remarkably important role. The apparatuses employed for lighting either indoor or outdoor scenes or the studio are very important.

Lighting apparatuses used are obviously variable, particularly as far as the power of the lamps is concerned, since the lamps can vary from a few Watts to very higher powers, up to 12000 Watt and even more.

Single lamps employed vary in function of the power. For example, they vary in the discharge or filament lamps, the distance of the focus, and the length of the tang.

Therefore, productions, or much more often companies specialised in renting apparatuses of this kind are obliged to keep in the storehouse a great number of very bulky apparatuses, in order to be able to satisfy the different needs.

Obviously, this kind of situation involves noticeable storage problems, as well as an increase of costs of the hires for purchasing the apparatus, and consequently the hire cost for the production companies.

SUMMARY OF THE INVENTION

In view of the above, the Applicant has realised a device allowing to adapt a single projector and at least two lamps of different powers and tradenames, without the need of having at one's disposal a large number of different projectors.

The solution according to the present invention can be indifferently adopted for projectors having the lamp mounted on the horizontal axis of the lamp or mounted on the vertical axis.

It is therefore a specific object of the present invention to provide a device for adapting a projector to different lamps. The device includes a fixing element for fixing a lamp to a support structure of said fixing element. The fixing element provides locking means for the lamp and adapting means for at least two different diameters of lamp tangs. The structure provides means for displacing the position of the fixing element of the lamp between at least two positions to adapt to the focal distance of the specific lamp.

Preferably, according to the invention, the fixing element for the lamp provides two jaws, respectively an upper and a lower jaw, for blocking the lamp. Each one of the jaws is provided with a couple of movable elements, slidable along the jaws, between a position in which it interacts with the lamp, adapting the fixing element to a diameter of the smallest tang, and a position in which it does not interacts with the lamp.

Preferably, according to the invention, the movable elements slidable along the jaws are locked by a release coupling.

According to a preferred embodiment of the device, the support structure for the fixing element provides a support of the fixing element, which includes two lateral elements each provided with slots by which the support of the fixing element slides between two fixing positions, and buckling means to block the support of the fixing element in the positions.

Preferably, according to the invention, the support structure provides handgrip means.

Still according to the invention, the support structure is provided with an electrical connection.

Always according to the invention, the slots are arc shaped and are provided with at least two stop positions.

Furthermore, according to the invention, the buckling means can be comprised of a spring.

BRIEF DESCRIPTION OF THE DRAWINGS

The present invention will now be described, for illustrative but not limitative purposes, according to its preferred embodiments, with particular reference to the figures of the enclosed drawings, wherein.

DETAILED DESCRIPTION OF THE INVENTION

In the enclosed figures, a device to be used with discharge lamps, 6000 watt and 12000 Watt respectively, will be described. However, it is well evident that it is only an illustrative example, since the device according to the invention can be used with different kind of lamps having a different ignition and power.

Further, a solution providing a horizontal axis lamp is described, however the solution could be also adopted for vertical axis lamps.

Figure 1:
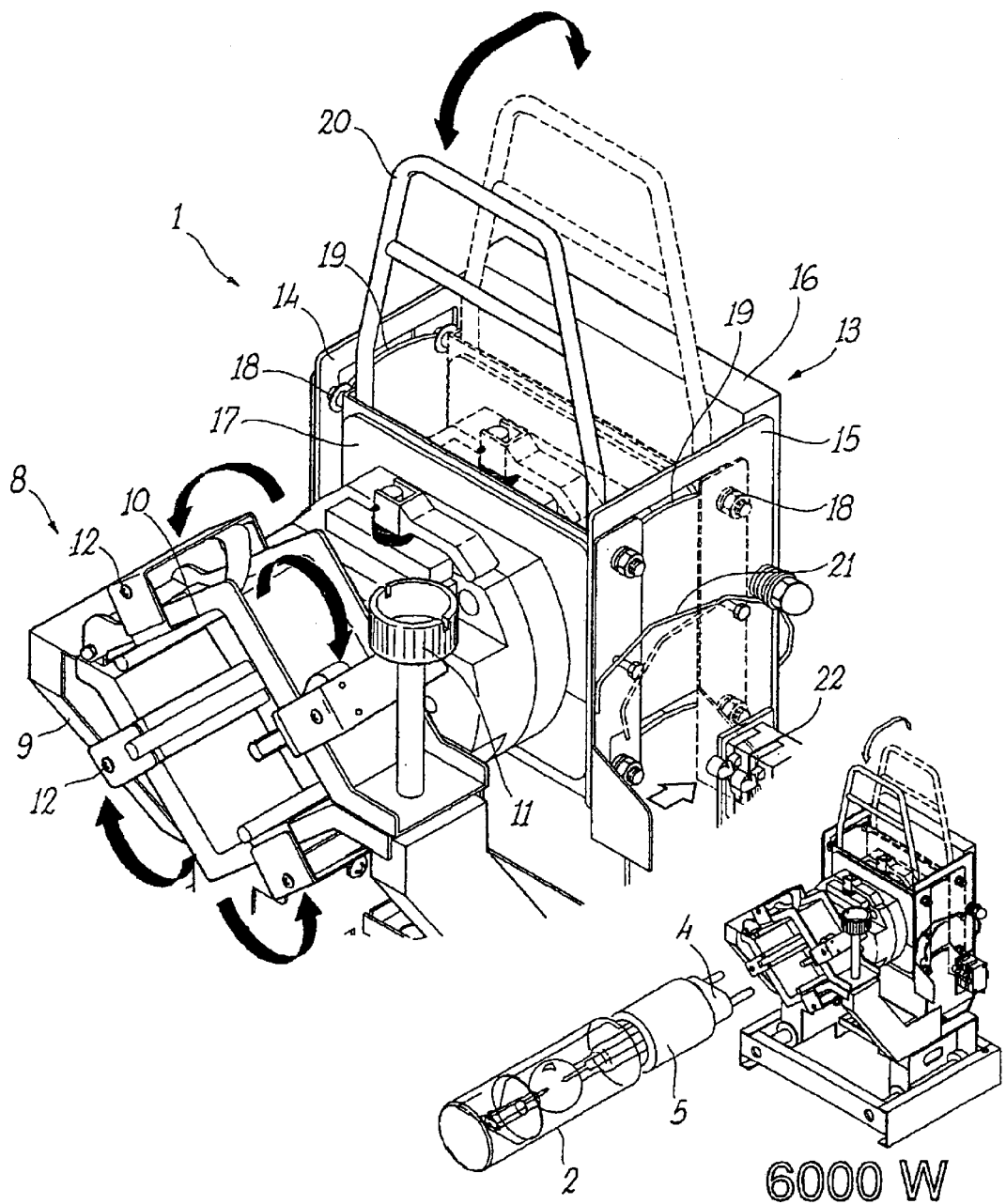
FIG. 1 is a perspective illustrative view of the device according to the invention in a first position.
Figure 2:
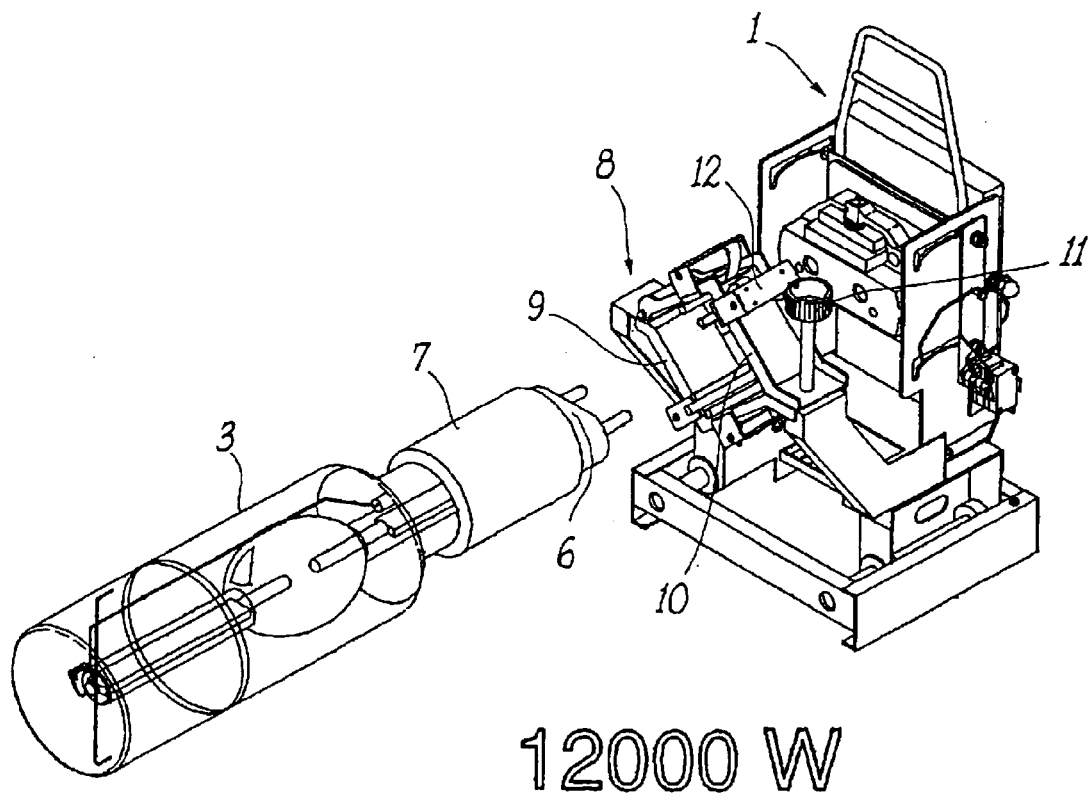
FIG. 2 is a perspective illustrative view of the device according to the invention in a second position.

Observing now all the figures of the enclosed drawings, it is shown a device 1 according to the invention, such that, in the position of FIG. 1 it is set to mount a 6000 Watt lamp 2, while in the position of FIG. 2 is set to mount a 12000 Watt lamp 3.

Since lamp 2 has a focus position closer to the coupling 4, as well as a smaller diameter tang 5, with respect to the lamp 3, the coupling and tang of which are respectively indicated by the reference numbers 6 and 7, the device 1 according to the invention must provide a coupling of the lamp 2 moved forward (FIG. 1).

Thus, device 1 provides a front fixing element 8 for lamp 2 or 3 providing two jaws, respectively a lower jaw 9 and a upper jaw 10, the upper jaw 10 being laterally pivoted and releasable by the screw 11 to allow for the introduction of the lamp 2 or 3.

In order to adapt to the diameter of tang 5 or 7 of lamp 2 or 3, respectively the two jaws 9 and 10 are each provided with a couple of slidable blocks 12 between two positions, respectively an active position, for the lamp 2 with a narrow tang 5 requiring a bigger thickness, or inactive, for the lamp 3 with a large tang 7 requiring a smaller thickness.

In this way, the device 1 according to the invention allows to obviate to the problem of adapting the projector (not shown) to different diameters of the tang.

Figure 3:
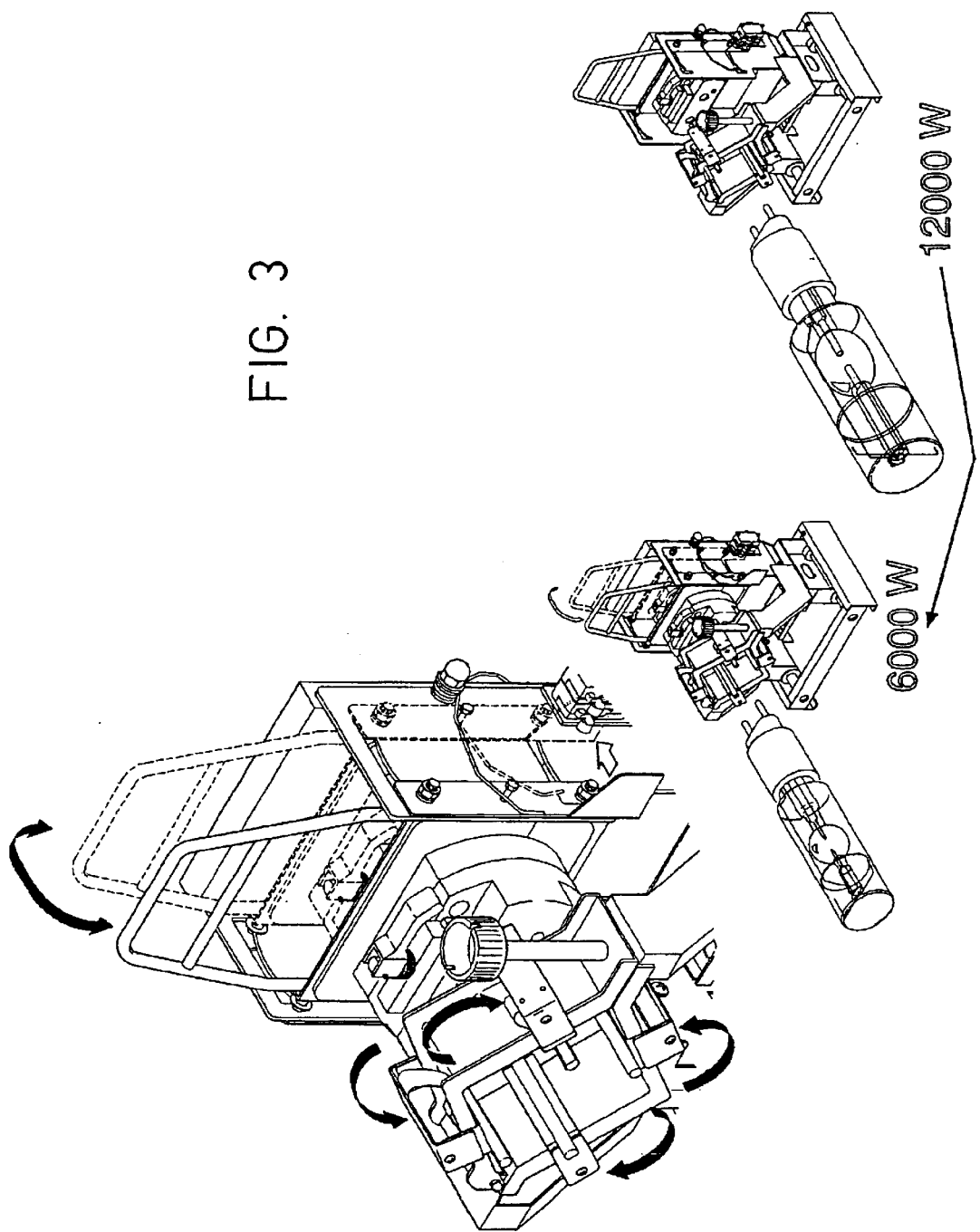
FIG. 3 shows the sequence of the motion of the device from the position shown in FIG. 1 to the position shown in FIG. 2.

In order to obviate the problem of the focal distance, element 8 for fixing the lamp 2 or 3 is mounted on a structure 13 providing two lateral walls 14 and 15, and a rear wall 16. The fixing element 8 is provided on a front wall 17 movable between the two positions shown in FIGS. 1 and 2, and in FIG. 3, by sliding of pins 18 along the slots 19 obtained on the lateral walls 14 and 15.

Above said wall 17 is provided a handgrip 20 for the displacement between the two positions.

The two slots 18 are shaped in such a way to require the lifting of the wall 17 to change the position, buckling elastic means 21 being provided on the lateral walls 14 and 15, that, once passed the median part of the slot 18, return the wall 17, along with the fixing element 8, downward in the new position.

By the reference number 22, it is indicated the section of the device 1 according to the invention for the electrical connection.

The present invention has been described for illustrative but not limitative purposes, according to its preferred embodiments, but it is to be understood that modifications and/or changes can be introduced by those skilled in the art without departing from the relevant scope as defined in the enclosed claims.

What is now claimed is:

1. A device for a projector to adaptively receive lamps of different sizes, the device comprises a fixing element for fixing a lamp to a support structure of said fixing element, the lamp having a lamp tang, said fixing element providing locking means for the lamp and integral adapting means for at least two different diameters of lamp tangs, said structure providing means for moving the fixing element for the lamp between at least two positions, to adapt to a focal distance of a specific lamp.

2. The device according to claim 1, wherein said fixing element for the lamp includes two jaws, an upper and a lower jaw, respectively, for blocking said lamp, each one of said jaws being provided with moveable elements slidable along said jaws between a position wherein the movable elements are adjacent to the lamp and a position wherein the movable elements are away from the lamp, such that the fixing element adaptively receives a lamp having a small tang.

3. The device according to claim 1 wherein said movable elements slidable along the jaws are locked by a release coupling.

4. The device according to claim 1 wherein said support structure for the fixing element provides a support of the fixing element, two lateral elements each provided with slots by which the support of the fixing element slides between two fixing positions, and buckling means to block the support of the fixing element in said positions.

5. The device according to claim 4, wherein said support structure provides handgrip means.

6. The device according to claim 4 wherein said support structure is provided with an electrical connection.

7. The device according to claim 4, wherein said slots are arc shaped slots, provided with at least two stop positions.

8. The device according to claim 4, wherein said buckling means are comprised of a spring.

9. A device for a projector to adaptively receive lamps of different sizes, the device comprises a fixing element for fixing a lamp to a support structure of said fixing element, the lamp having a lamp tang, said fixing element providing locking means for the lamp and adapting means for at least two different diameters of lamp tangs, said structure providing means for moving the fixing element for the lamp between at least two positions to adapt to a focal distance of a specific lamp, and wherein said fixing element for the lamp includes two jaws, an upper and a lower jaw, respectively, for blocking said lamp, each one of said jaws being provided with moveable elements slidable along said jaws between a position wherein the movable elements are adjacent to the lamp, and wherein the moveable elements are away from the lamp, such that the movable elements slidable along the jaws are locked by a release coupling.

10. A device for a projector to adaptively receive lamps having a wattage between 125 W and 12000 W, the device comprises a fixing element for fixing a lamp to a support structure of said fixing element, said lamp including a lamp tang, said fixing element providing locking means for the lamp and adapting means for at least two different diameters of lamp fangs, said structure providing means for moving the fixing element for the lamp between at least two positions, to adapt to a focal distance of a specific lamp.

* * * * *